UNITED STATES PATENT OFFICE.

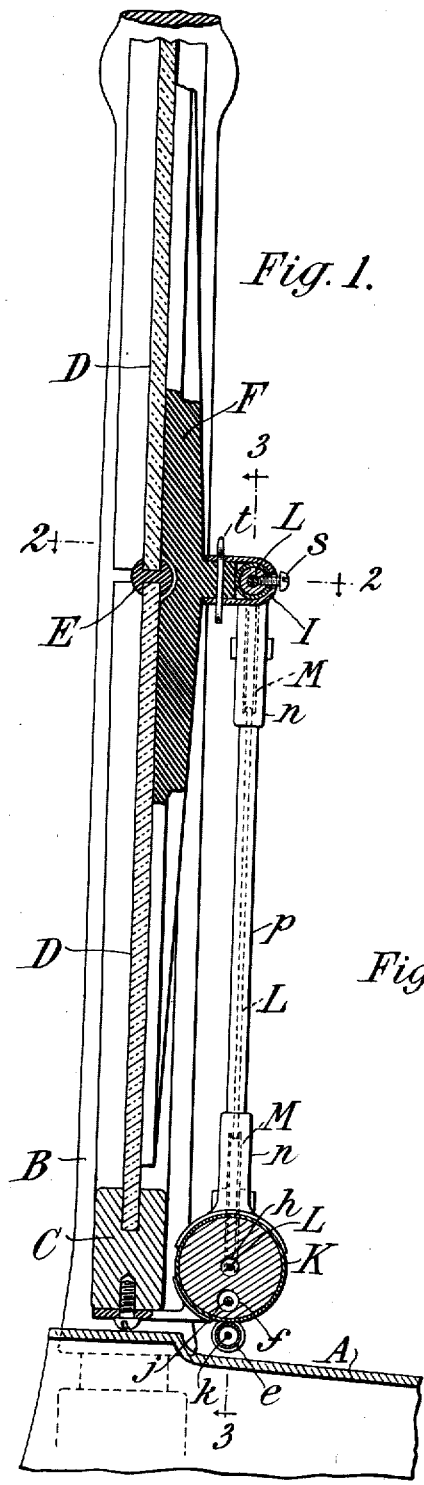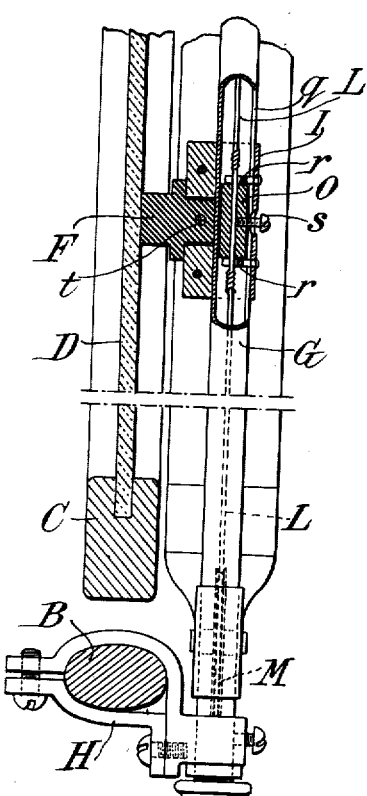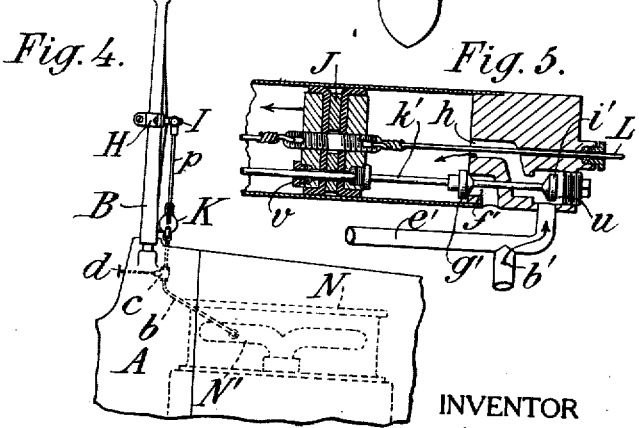

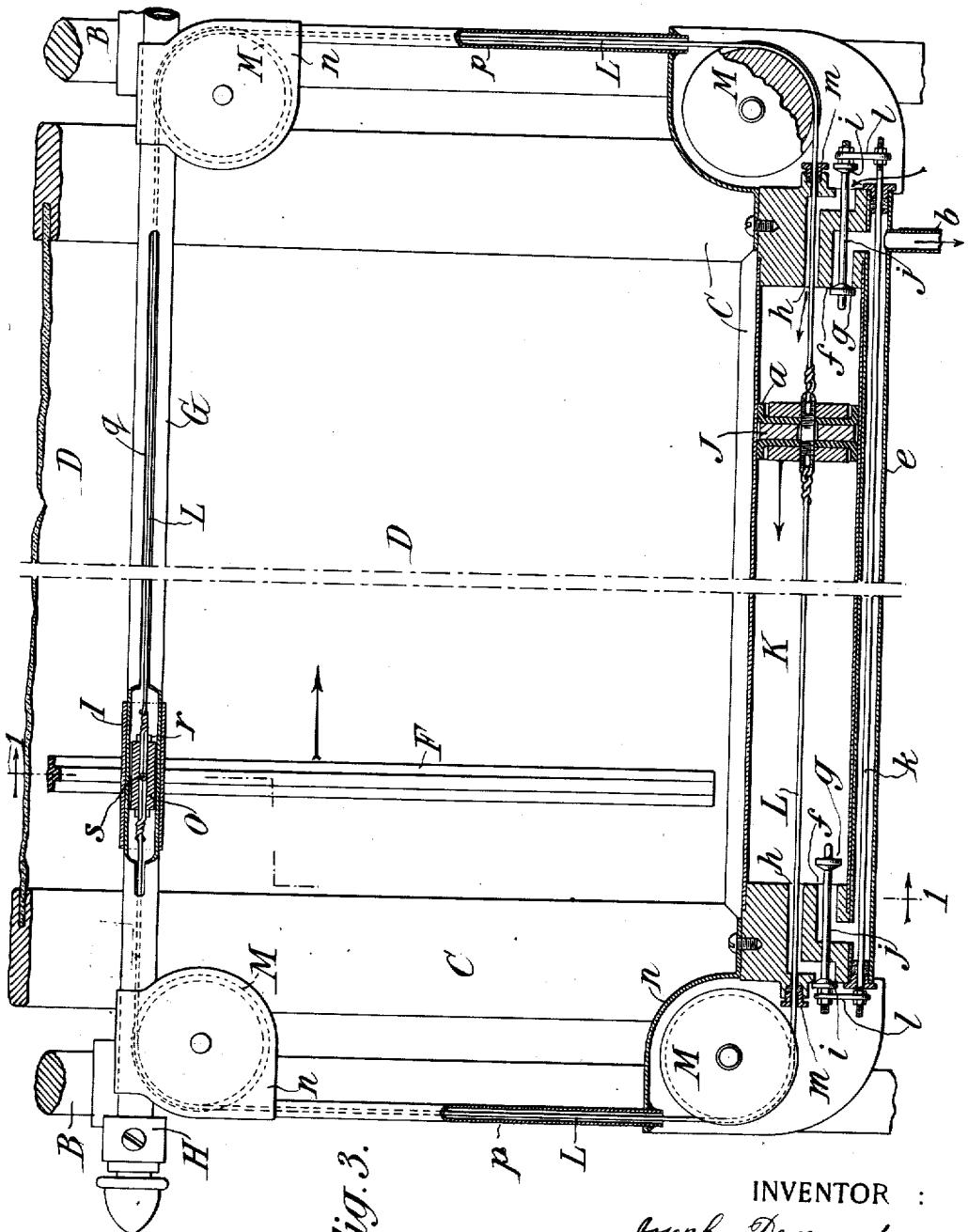

JOSEPH DEMAND, OF NEW YORK, N. Y.

WINDSHIELD-CLEANER.

1,370,684.  Specification of Letters Patent.  Patented Mar. 8, 1921.

Application filed October 20, 1919. Serial No. 331,860.

*To all whom it may concern:*

Be it known that I, JOSEPH DEMAND, a citizen of the United States of America, residing in the borough of Bronx, county of Bronx, city and State of New York, have invented certain new and useful Improvements in Windshield-Cleaners, of which the following is a specification.

This invention provides automatic means for cleaning windshields of automobiles or other vehicles.

Various manually-operated windshield cleaners are known, but these have the disadvantage that it is difficult, and at times impossible, for the driver of the car to operate them with safety while the car is running. The present invention aims to overcome this disadvantage by providing a device which is operated automatically by means of energy taken from the power unit of the car, so that when started by the driver it will continue to function and keep the windshield cleansed from rain, mist or spray until the driver puts it out of operation.

It consists essentially of a wiper for the glass and power-driven means for reciprocating it, such means being controlled by an operating handle which should be within easy reach of the driver. Preferably the power employed is that of fluid pressure, preferably by suction action which may most conveniently be availed of by a connection with the intake manifold of the engine.

The preferred embodiment is illustrated in the accompanying drawings, wherein,—

Figure 1 is a vertical section on the line 1—1 in Fig. 3;

Fig. 2 is a horizontal section on the line 2—2 in Fig. 1;

Fig. 3 is a front elevation partly in vertical section, in the plane of the line 3—3 in Fig. 1;

Fig. 4 is a side elevation on a smaller scale, showing the hood of an automobile and the windshield frame with the cleaner of the present invention attached thereto.

Fig. 5 is a fragmentary section corresponding to Fig. 3, showing one end of the cylinder, to illustrate a modified valve construction.

Referring to the drawings, let A designate the body of the autotmobile, comprising its hood or bonnet. B is the windshield frame, of any usual construction, mounted on such body. C is the sash of the windshield, D D the glass panes thereof, and E in Fig. 1 the usual soft rubber packing between the edges of the upper and lower panes. All of these parts are or may be of the usual or any known construction.

The windshield cleaner comprises a movable wiper F of any suitable construction, adapted to move across the face of the glass and free it from moisture or anything tending to cloud or obscure it. This wiper may be of any suitable material adapted to this purpose, and it may be mounted to move or wipe across the glass in any suitable direction. It is best applied to the outer or front face of the windshield. It is best made in the form of an upright bar, and its direction of wiping movement is preferably a rectilinear horizontal movement, whereby it may wipe across the face of the glass from end to end. It may be applied, as shown, to simultaneously wipe the upper and lower panes, or it may be applied to one pane only, or separate wipers may be provided for the respective panes. The precise construction and mounting, and direction of movement of the wiper, are not essential to the invention.

The wiper is moved automatically back and forth by power taken from any suitable source in connection with the power plant of the car. The application of this power is under the control of the driver, who can start it and stop it at will. Preferably, also, he can by adjustment control the speed of movement.

In the preferred construction shown, the wiper F is mounted to slide along a stationary horizontal guide bar G which constitutes a slideway. This bar G is fastened by any suitable clamping or other means to the upright bars of the windshield frame B. A suitable construction of clamp for this purpose is shown at H in Fig. 2. The wiper is suitably connected to a slide I which moves along the guide bar G. Its movement is imparted to it from a piston J moving in a cylinder K which is fastened in front of the windshield and preferably to the lower member of the frame C, as shown in Fig. 1. The connection between the piston J and the slide I is best accomplished through the medium of a flexible connector such as a cable cord or wire L which to reduce friction is carried over four pulleys M suitably mounted in the framework of the cleaner, and preferably hooded so as to be concealed. The piston J should move freely in the cylinder K, and may have cupped packings a, as shown, or be otherwise packed to afford a reasonably fluid-tight joint. The fluid pressure for operating the piston is best secured by a connection with the intake manifold of the engine. This is shown in Fig. 4, where the engine, N, is indicated in dotted lines, its intake manifold being shown in dotted lines at N'. Tapped into this manifold is a small tube b which communicates with the cylinder K, a valve c being introduced whereby the tube may be closed or opened by turning an operating handle d which may be placed in any convenient position on the dash.

As the piston reaches either end of its stroke it operates some suitable valve mechanism whereby to reverse the fluid current and cause it to move in the contrary or backward direction. This result is best secured by a simple tappet valve mechanism, as best shown in Fig. 3. The tube b communicates with a transverse pipe e terminating in valve ports f at opposite ends of the cylinder K, these ports being provided with valves g g. Other ports h h are provided opening from the ends of the cylinder to the outer air, and these are controlled by valves i i which may conveniently be mounted on the same stems j as the valves g. These stems serve as tappets, so that when struck by the piston at the end of its movement, the valve g at that end is closed and the valve i at that end is opened. To perform the contrary operation at the opposite end, any suitable connection is made between these valves at one end with the corresponding valves at the other. This connection is shown as accomplished by means of the reciprocating rod k, which for convenience is mounted to move through the pipe e, passing out from the opposite ends thereof through stuffing boxes and being there connected by crossheads l l with the stems j j respectively. Thus, when the piston on approaching one end of the cylinder closes the valve g at that end, it opens the valve g at the opposite end, and the valves i i are simultaneously operated, the former being opened and the latter closed.

With the parts in the position shown in Fig. 3, the wiper F is moving to the right and the piston J is moving to the left. This movement is accomplished by atmospheric pressure entering through port h at the right, while the reduced pressure to the left of the piston is drawn off past open valve g through port f and pipe e to the tube b which carries the eduction current into the intake manifold, wherein the suction created by the running of the engine is availed of to supply the requisite power. On the piston reaching the left-hand end of the cylinder, it strikes the tappet and reverses the valves, as already described, whereupon atmospheric air enters at the left and the suction exhaust is taken off from the right-hand end. Thus the wiper moves back to the opposite end of the glass. These alternate movements will be continued so long as the valve c remains open, and the speed of these movements may be controlled by opening this valve more or less. When the weather conditions no longer require wiping the windshield, the operator closes this valve.

In the construction shown the cable L passes out from the opposite ends of the cylinder through stuffing boxes m m to prevent leakage. The pulleys M M are inclosed and concealed by means of hoods n constructed as corner pieces of the windshield cleaner. At the right and left sides the cable L is preferably carried through tubes p which are connected between the upper and lower hoods n. At the top the cable is carried centrally through the tubular guide bar G and connected to a sliding block O which moves within this tubular bar and is connected in any suitable manner to the slide I which moves upon the exterior of the bar, this connection being made through a slot q formed along the front of the bar. In Fig. 2 the connecting means is shown as arms or fingers r r fastened rigidly to the slide I and embracing the block O between them. The wires or cables are preferably passed through the block and twisted together beyond the ends of the block, and to further securely connect the block to the cables a set-screw s is provided which screws into the block and clamps against the wires. To enable the wiper F to be disconnected from the slide I, these parts are constructed the one with a projection and the other with a socket, and a pin t is provided which normally connects them and which may be removed when it is desired to take off the wiper.

Fig. 5 illustrates a modification in which fluid pressure instead of suction is used to propel the motor. This construction is readily applicable to trolley cars and other vehicles having pneumatic brakes, as the air pressure for the purpose may be taken from the brake reservoir. The valve construction amounts to a simple reversal of the functions of the valves g i shown in Fig. 3. The compressed air conduit b' leads to a cross tube e' which communicates at each end with an inlet chamber u from which, when valve i' is open, the air passes through port h into the cylinder to propel the piston, while at the opposite end of the cylinder where valve g' is open, the air exhausts through port f'. The tappet action is the same as before described.

Fig. 5 also shows a modified arrangement of the connection between the valves at opposite ends of the cylinder. Instead of using a separate rod $k$ outside of the cylinder, the one valve rod $k'$ is carried directly through the cylinder from end to end, so that it passes through the piston as shown. To prevent any material leakage of fluid through the piston along this valve rod, it may pass freely through one or more stuffing boxes $v$ constructed in the piston.

It must not be inferred from the particularity with which I have shown and described the preferred construction, that my invention is limited to the details thereof. On the contrary, the invention is susceptible to a considerable range of variation, as will be apparent to those skilled in the art. The construction may therefore be modified to any desired extent within the scope of the appended claims.

Obviously the invention is applicable not only to motor cars, but to any moving vehicle having a windshield, such, for example, as flying machines or dirigibles. The term "automobile" is used to include any self-propelled vehicle.

I claim as my invention:—

1. A windshield cleaner for automobiles, comprising a reciprocating wiper, a guide therefor extending parallel with the windshield, a cylinder mounted on the windshield frame so as to be movable therewith, a piston in said cylinder, and a flexible connector communicating movement from said piston to the wiper, the cylinder having stuffing boxes in its ends through which said connector passes, and pulleys over which said connector is carried in its passage from the cylinder to the wiper.

2. A windshield cleaner comprising a rectangular frame adapted to be attached to the windshield, one horizontal element of said frame constituting a guide, a wiper for the windshield engaging said guide, another horizontal element of the frame comprising a cylinder having end stuffing boxes, pulleys mounted on said frame, a piston in said cylinder, and a flexible connector attached to said piston, passing out through said stuffing boxes, carried over said pulleys, and connected to said wiper.

3. A windshield cleaner comprising a rectangular frame adapted to be attached to the windshield, one horizontal element of said frame constituting a guide, a wiper for the windshield engaging said guide, another horizontal element of the frame comprising a cylinder having end stuffing boxes, pulleys in the corners of the frame, a piston in said cylinder, and a flexible connector communicating movement from said piston to said wiper and carried over said pulleys.

4. A windshield cleaner according to claim 3, the corners of the frame formed with housings for said pulleys, which housings connect the horizontal and upright elements of the frame.

5. A windshield cleaner according to claim 3, the frame formed of horizontal and upright tubular members arranged in the plane of the connector, and housings for said pulleys, the latter arranged in the same plane, and the cable being carried through said tubular members, whereby it is wholly inclosed.

6. A windshield cleaner for automobiles, comprising a reciprocating wiper, a guide therefor extending parallel with the windshield, a cylinder mounted on the windshield frame, so as to be movable therewith, a piston in said cylinder, and a flexible connector communicating movement from said piston to the wiper, the cylinder having stuffing boxes in its ends through which said connector passes.

In witness whereof, I have hereunto signed my name.

JOSEPH DEMAND.